Jan. 26, 1937. J. ROBERT 2,068,767
PROCESS AND APPARATUS FOR SURFACING ROOFING
Filed July 19, 1933   2 Sheets-Sheet 1
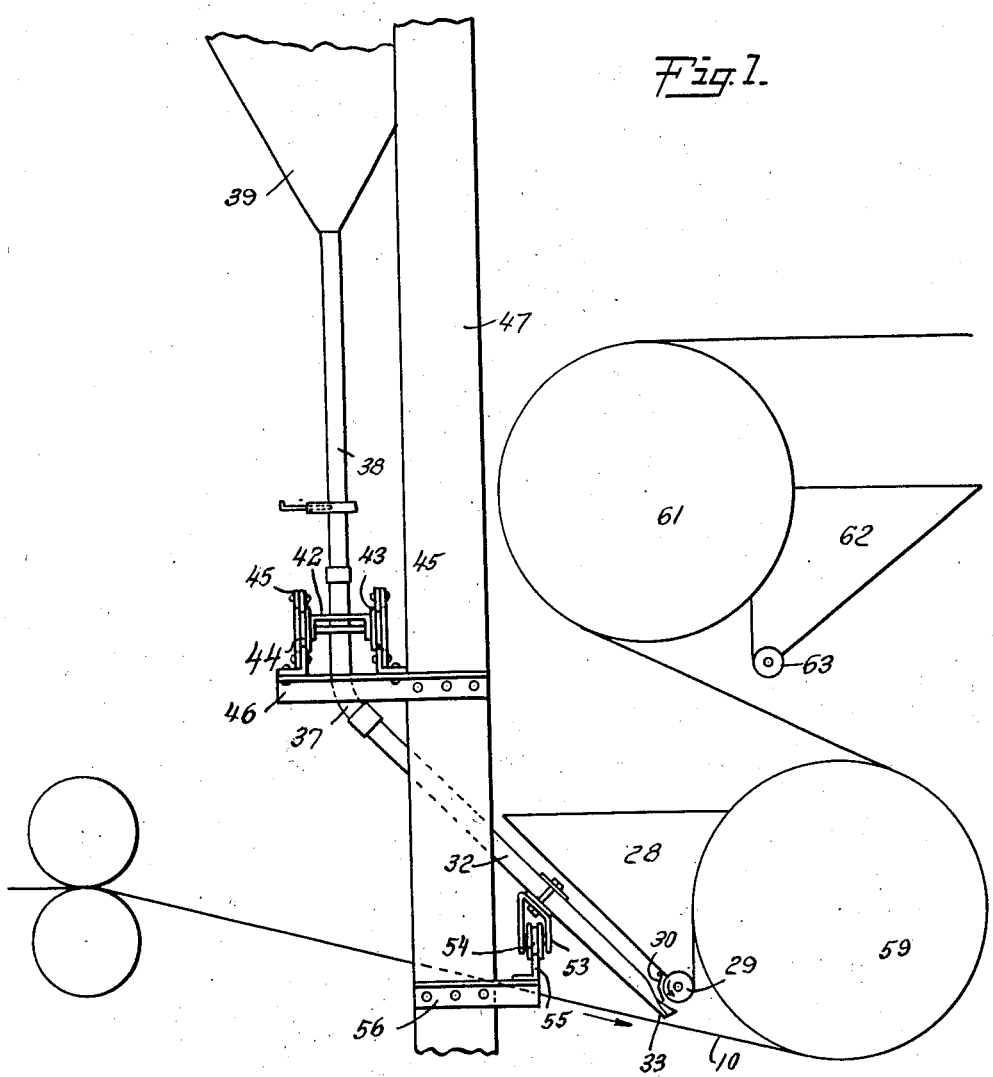
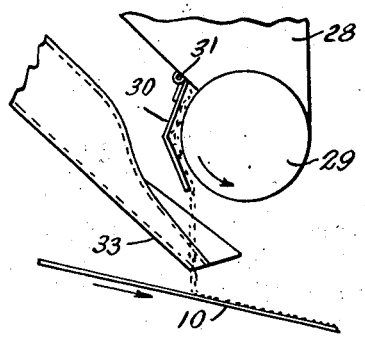
INVENTOR
John Robert
BY
ATTORNEY

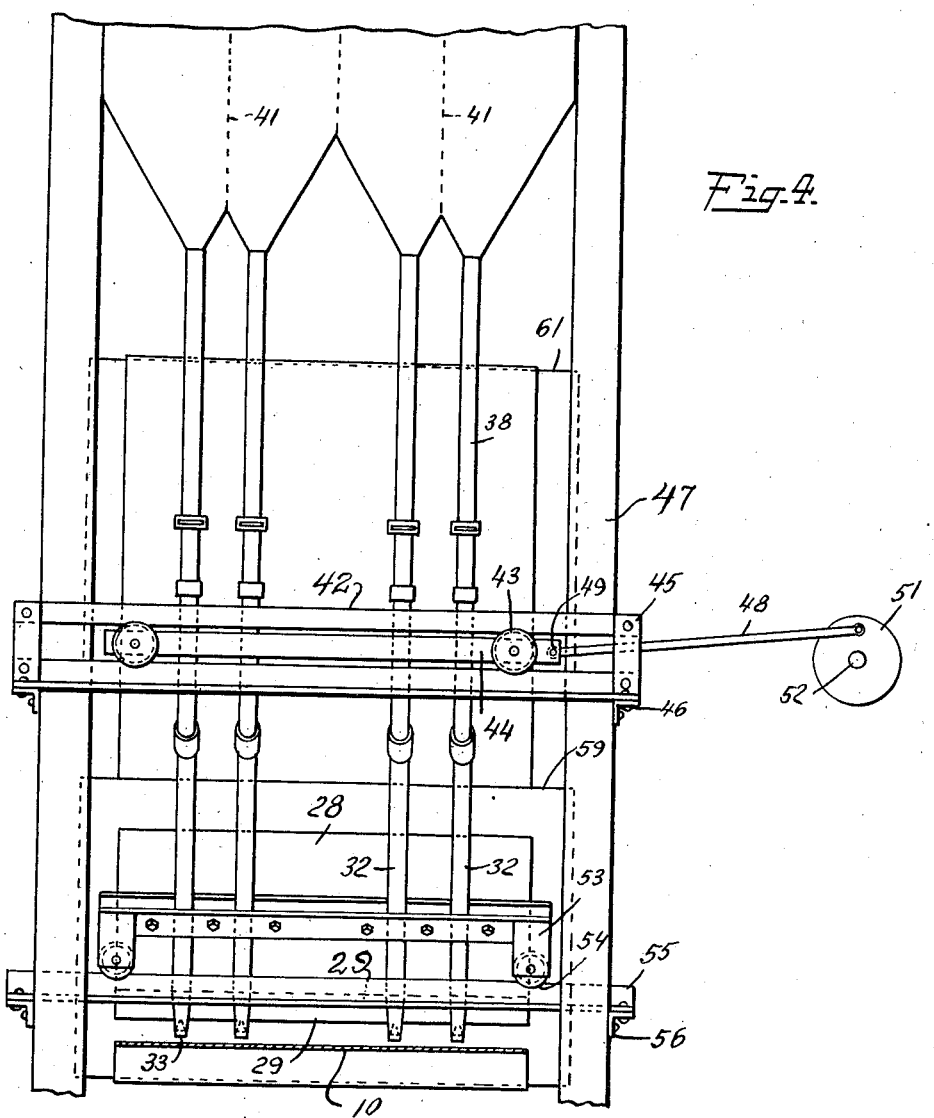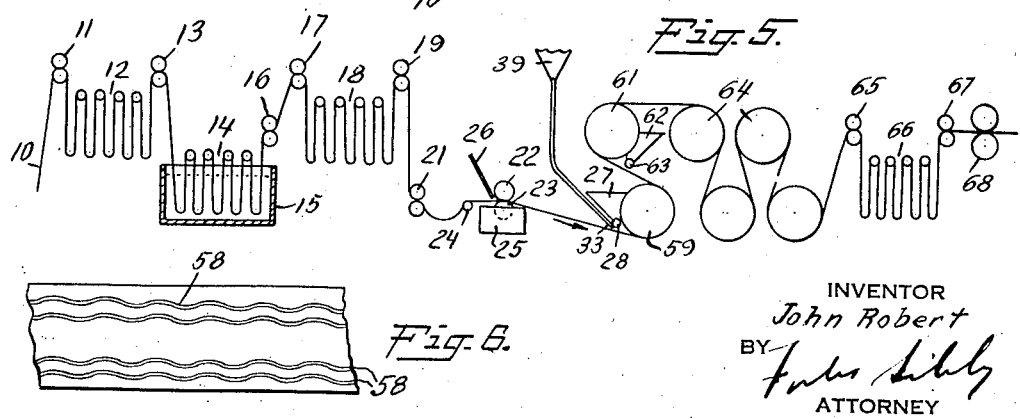

Patented Jan. 26, 1937

2,068,767

UNITED STATES PATENT OFFICE 2,068,767

PROCESS AND APPARATUS FOR SURFACING ROOFING

John Robert, Chicago, Ill., assignor to The Barrett Company, New York, N. Y., a corporation of New Jersey Application July 19, 1933, Serial No. 681,070

13 Claims. (Cl. 91—43)

This invention relates to roofing, and more particularly, to the surfacing of roofing with differently colored granular material to produce roofing presenting a variegated appearance. The term "roofing" is used herein in a broad sense and is intended to include not only the usual felt base composition roofing, whether employed for covering roofs, walls, or other surfaces, but also other covering material, such as that made from a mastic or adhesive composition and adapted to be surfaced with granular material.

It has been proposed to surface roofing by applying contiguous longitudinal parallel stripes or bands of differently colored granular material to a roofing sheet. To create wavy stripes on the roofing sheet, the hopper from which the granular material was fed was reciprocated transversely of the direction of movement of the sheet. To get away from the monotonous regularity of such striped sheets, it has been suggested that granular material be applied in two steps, the granular material applied during the first step covering selected areas and granules of a contrasting color applied during the second step covering the entire sheet including the portions of the sheet covered in the first step. Such procedure, it will be appreciated, involves the excessive handling and waste of granular material. Furthermore, considerable excess of granular material of different colors is applied. This must be removed from the sheet and recovered. It is difficult and requires a complicated mechanical layout to recover such excess without mixing the colors, and the resultant irregular blend is of diminished value for surfacing. It has also been proposed to simultaneously apply to a roofing sheet two streams of granular material, each stream of a width sufficient to completely cover the sheet. One stream was fed from a hopper having partitions dividing it into compartments containing differently colored granular material so that a striped effect was produced. The other stream was fed from a hopper containing a solid color of granular material which blended with and masked to some extent the color of the stripes produced by the granular material fed from the first-mentioned hopper. Such procedure also involves excessive handling and waste of granular material.

It is an object of this invention to provide a one-step surfacing procedure producing variegated appearing roofing which procedure, as compared with known surfacing processes, minimizes the handling of granular material and results in the production of pleasing, variegated appearing roofing. In accordance with the procedure of this invention, a stream of granular material, preferably of a width at least equal to that of a continuously moving coated roofing sheet is passed through a substantially vertical plane onto the roofing sheet, the flow of the stream being intercepted along spaced points in its plane of flow by means of a plurality of spaced oscillating hollow members. These hollow members prevent the flow of portions of the streams onto selected areas of the coated sheet. The portions thus left uncovered by granules constituting the first stream are covered with granules fed through the hollow members or spouts, which granules may be of a different color or degree of coarseness as compared with the granules constituting the first-mentioned stream. Owing to the contrasting color or other physical characteristics of the granules delivered through the hollow members and discharged directly onto the sheet and also the oscillatory motion imparted to the hollow members, roofing of pleasing variegated appearance is produced.

Another object of this invention is to provide apparatus of comparatively simple design and efficient in operation for practicing the surfacing procedure of this invention. Other objects and advantages will be apparent from the following detailed description taken in connection with the accompanying drawings, in which—

Fig. 1 is a side elevation, the parts being broken away for the sake of clarity, of surfacing apparatus embodying this invention;

Fig. 2 is a fragmentary side elevation showing the arrangement of distributor roll and hollow member for intercepting flow of granular material discharged by the distributor roll;

Fig. 3 is a front view of a single hollow member looking at such member in the direction indicated by the arrow on Fig. 2. For the sake of clarity, flow of grit from the hollow members is not shown on the drawings, only the grit stream from the hopper 28 being depicted;

Fig. 4 is a fragmentary front elevation of the surfacing apparatus of this invention;

Fig. 5 is a side elevation somewhat diagrammatic in character showing equipment for making composition roofing; and Fig. 6 is a fragmentary plan view of roofing surfaced in accordance with this invention.

Referring to the drawings, with particular reference to Fig. 5, a sheet of fibrous material 10, which may be, and preferably is, of the usual roofing felt made of rag fiber, paper stock, or other fibrous material, with or without suitable fillers, as well known in the roofing art, is fed by feed rolls 11 from the usual paper making machine or felt roll into a looping device 12. From this looping device, rolls 13 feed the sheet into any suitable type of saturating apparatus indicated generally by the reference numeral 14. Saturating tank 15 may contain suitable cementitious waterproofing composition, such as asphalt or other bituminous material utilized for the impregnation and saturation of roofing felts.

Feed rolls 16 and 17 feed the saturated sheet to a second looping device 18. The passage of the saturated fibrous sheet or base through the looping device 18 gives the saturant an opportunity to dry and to impregnate thoroughly the base. Feed rolls 19 and 21 feed the saturated sheet from the looping device 18 to the coating apparatus involving a pair of coating rolls 22, 23. Feed rolls 21 are preferably driven at a slightly greater peripheral speed than the coating rolls 22, 23, slack accumulating between the driven rolls 21 and the guide roll 24, over which the sheet passes before entering the bite of the coating rolls 22, 23. Coating roll 23 is rotatably mounted in a tank 25 which may contain bituminous material, such as asphalt or other cementitious waterproofing substance suitable for coating roofing felt. Bituminous material, such as asphalt, may be applied to the top of the sheet by means of a pipe 26 having a spout of a width approximately equal to that of the sheet. As the sheet passes between the coating rolls 22, 23, the underside is completely coated by roll 23. The coating material delivered by pipe 26 is spread uniformly over the top side of the sheet by the coating roll 22, excess coating material passing over the edges of the sheet and draining into the tank 25.

Immediately after leaving the coating rolls 22, 23 and while the coating material is still soft and tacky, the coated sheet passes under the surfacing apparatus indicated generally by the reference numeral 27. This surfacing apparatus comprises a hopper 28, preferably of a length equal to the width of the roofing sheet 10 passing therebeneath. A fluted distributor roll 29 is rotatably mounted in the discharge outlet of the hopper 28 and is arranged to be rotated in the direction indicated by the arrow (Fig. 1) by suitable driving mechanism. A guide plate 30 is pivotally mounted as at 31 to the hopper 28 to guide the discharge of granular material onto the moving sheet.

A plurality of hollow members or hoses 32, four in the embodiment of the invention shown on the drawings, are mounted for oscillation, as will hereinafter be more fully described, and are arranged with their discharge outlets 33 disposed to intercept granular material discharged by the distributor roll 29 from hopper 28. These hoses may be of metal, and for the most part are circular in section. The discharge ends, however, are flattened and shaped, as shown in Fig. 3, so that the extreme end 34 is rectangular in cross section. The upper portion of the discharge end is composed of walls 36 inclining towards the longitudinal median line 35 of the hose. Thus, looking down on the discharge end of each hose, the walls 36 incline downwardly, away from the longitudinal median line thereof so that granular material intercepted by the hose gravitates downwardly away from the longitudinal median line 35 discharging onto the moving sheet on the areas thereof contiguous to the areas covered by granular material fed through the discharge outlets 34.

Hoses 32 each communicate with a flexible pipe section 37, which in turn is connected to a valve-controlled pipe 38 communicating with a hopper 39. The pipe 38 may be connected with one hopper which is supplied with granular material, such as crushed rock, slate or other surfacing mineral of one color, degree of coarseness or physical characteristics different from the granular material supplied to hopper 28 or the hopper 39 may be divided by partitions 41 into sections or compartments, each of which is supplied with a different color granular material or with granules of the same color.

One form of mechanism for reciprocating or oscillating the hoses 32 is shown in Figs. 1 and 4 but it will be understood that other mechanism for this purpose may be employed. In the form of invention shown on the drawings, the hose sections 37 pass through suitable openings in a carriage 42, the wheels 43 of which travel in guide slots 44 in the frames 45, one at each side of the carriage, as shown in Fig. 1. The frames 45 are riveted or otherwise secured to a channel member 46, in turn riveted to the standards 47. A link 48 has one end pivoted as at 49 to the carriage 42 and the other end pivotally secured to a disc or crank 51 rotatably keyed to shaft 52 driven from any suitable source of power. Rotation of shaft 52 through link 48 causes reciprocation of the carriage 42 with consequent movement of flexible hose sections 37 and the connected hollow members or pipes 32 transversely of the direction of movement of sheet 10. A guide carriage or frame 53 through which the hollow members 32 extend has the wheels 54 thereof arranged to travel on a rail 55 suitably secured to a channel bar 56 riveted to the standards 47. As indicated above, movement of the hose sections 37 causes simultaneous movement of the hollow members 32, movement of which is guided by carriage 53 traveling on rail 55.

In operation, grit of one color or other physical character is showered by means of the continuously rotated roll 29 onto the coated sheet passing therebeneath. Thus a continuous stream of grit is delivered from hopper 28 and flows in a substantially vertical plane, represented by the dotted lines showing the path of flow of grit from roll 28 to the sheet on Fig. 2. As appears from Fig. 3, portions of this stream of grit are intercepted by the hollow members 32. Grit of a contrasting color is delivered through these hollow members, the grit thus delivered flowing through the vertical plane of flow of the grit from hopper 28, the resultant stream of grit being deposited onto the moving roofing sheet. The grit intercepted by the hollow members gravitates along the inclined sides 36 of these members onto the portions of the roofing sheet contiguous to the portions covered by the differently colored grit fed through the discharge outlets 34. Due to the reciprocation of the hollow members by the mechanism hereinabove described, transversely of the direction of movement of the sheet, wavy stripes or bands 58 (Fig. 6) are formed, the marginal portions of which are constituted of a blend of granules formed by the mixing of the granules from the hollow members and that delivered by the distributing roll 28.

After being surfaced, as hereinabove described, the surfaced sheet passes about reversing roll 59 which functions to partially embed the mineral granules in the plastic coating. Any excess granules fall from the surfaced sheet as it travels from the reversing roll 59 to a second reversing roll 61 into the hopper 28. If it is desired to apply a solid color of granules to the sheet from hopper 28 and not a blend of granules, a separate hopper may be provided for receiving the excess granules falling off from the surfaced sheet. Such hopper may be disposed immediately above the hopper 28 and in position to receive granules as they fall from the surfaced sheet upon leaving roll 59.

In the continued passage of the surfaced sheet, it travels next under a hopper 62. Powdered talc, mica, or other anti-stick composition capable of rendering the back of the sheet non-cementitious is disposed in hopper 62 and is discharged therefrom by a distributing roll 63 onto the coating on the back of the sheet in the form of a talc surfacing layer covering substantially the entire width of the sheet. The talc covered sheet then passes over reversing roll 61, which partially embeds the talc in the seal back coating and imparts a smooth surface to the back of the sheet. Excess talc falls from the sheet as it passes from reversing roll 61 to the first of a series of calender rolls 64. From the calender rolls 64, the sheet may be fed by feed rolls 65 through a looping rack 66 where the coated and surfaced product is given an opportunity to cool. Feed rolls 67 may feed the surfaced sheet into a winding machine where it may be wound into rolls which are shipped or used as the desired roll roofing product or these feed rolls may feed the surfaced sheet into cutting cylinders 68 for cutting the sheet into individual or strip shingles.

The term "granular material" is used in the specification and claims in a broad sense and is intended to include all surfacing materials employed in the surfacing of roofing, siding, etc.

Since certain changes in carrying out the above process and certain modifications of the apparatus may be made without departing from the scope of this invention, it is intended that all matter contained in the above description or shown in the accompanying drawings shall be interpreted as illustrative and not in a limiting sense.

I claim:

1. The process of surfacing roofing, which comprises flowing a stream of granular material through a substantially vertical plane onto a moving roofing sheet said stream being of a width sufficient to completely cover the roofing sheet, intercepting a portion of said stream, and flowing onto said sheet granules of a different color as compared with the granules constituting the first-mentioned stream through said vertical plane to take the place of the intercepted granules.

2. The process of surfacing roofing, which comprises flowing a stream of granular material through a substantially vertical plane onto a moving roofing sheet, intercepting portions of said stream along a plurality of spaced points, and flowing onto said sheet granules of a different color as compared with the color of the granules constituting the first-mentioned stream through said vertical plane to take the place of the intercepted granules.

3. Surfacing apparatus comprising, in combination, means for flowing a stream of granular material onto a continuously moving roofing sheet, means for deflecting said stream to prevent flow of a portion of said stream onto a portion of said sheet, and means for flowing granular material of different characteristic from that of said stream onto the said portion of said sheet, said last mentioned means being constructed and arranged to flow granular material onto substantially only that portion of the sheet not covered by said stream.

4. Surfacing apparatus comprising, in combination, means for flowing a stream of granular material of a width sufficient to completely cover the sheet through a substantially vertical plane onto a moving roofing sheet, means for deflecting a portion of said stream to prevent the flow thereof onto said sheet, and means for flowing a second stream of granules onto the portion of said sheet not covered by granules from the first-mentioned stream, said last mentioned stream being of a width insufficient to cover said sheet.

5. Surfacing apparatus comprising, in combination, means for flowing granular material onto a continuously moving sheet, a hollow member for intercepting the flow of a portion of the granular material, and means for flowing granular material through said hollow member onto said sheet.

6. Surfacing apparatus comprising, in combination, means for flowing granular material onto a continuously moving sheet, a hollow member for intercepting the flow of a portion of the granular material, means for flowing granular material through said hollow member onto said sheet, and means for reciprocating said member transversely of the direction of movement of said sheet.

7. Surfacing apparatus comprising, in combination, a hopper containing granular material, means to feed granular material from the hopper onto a sheet, a hollow member disposed to intercept the flow of a portion of the granular material discharged from said hopper, and means for feeding other granular material through said hollow member.

8. Surfacing apparatus comprising, in combination, a hopper for granular material, means for continuously moving sheet material beneath said hopper, a hollow member disposed between said sheet material and said hopper and arranged to intercept flow of granular material discharged from said hopper, means for reciprocating said hollow member transversely of the direction of movement of said sheet material, and means for feeding granular material through said hollow member onto said continuously moving sheet.

9. Surfacing apparatus comprising, in combination, a hopper for granular material, a distributor roll rotatably mounted in said hopper, means for continuously moving a roofing sheet beneath said hopper, a plurality of hollow members disposed to intercept the flow of granular material discharged by said distributor roll, and means for feeding other granular material through said hollow members onto said continuously moving sheet.

10. Surfacing apparatus comprising, in combination, a hopper for granular material extending across the width of a roofing sheet, means for moving said sheet beneath said hopper, a hollow member having its discharge outlet disposed in the path of flow of granular material from said hopper, the top side of said member onto which granular material from the hopper flows being inclined downwardly from the median portion thereof so that granular material fed thereon gravitates away from the median portion, and means for feeding granular material through said hollow member onto said sheet.

11. Surfacing apparatus comprising, in combination, a hopper for granular material, said hopper extending across the width of a roofing sheet movable therebeneath, a plurality of hollow members, each having its discharge outlet disposed in the path of flow of granular material from said hopper and arranged to intercept the flow of granular material from said hopper, the top side of each of said members onto which granular material from the hopper flows being inclined downwardly away from the median portion thereof so that granular material fed thereon gravitates downwardly away from said median portion, means for feeding granular material through said hollow members, and means for reciprocating said hollow members transversely of the direction of movement of said roofing sheet.

12. The process of surfacing sheet material, which comprises flowing a stream of granular material onto a continuously moving sheet, intercepting the flow of a portion of said stream and flowing granular material of a different color from the first-mentioned granular material onto said sheet to take the place of the intercepted granules and form with the non-intercepted granules a substantially continuous stream.

13. The process of surfacing sheet material which comprises flowing a stream of granular material onto a continuously moving sheet, intercepting the flow of a portion of said stream and flowing granular material of different characteristics from the first mentioned granular material onto said sheet to take the place of the intercepted granules and form with the non-intercepted granules a substantially continuous stream.

JOHN ROBERT.